United States Patent

[11] 3,575,569

| [72] | Inventors | Henry D. Mitchell, Jr.<br>Winston-Salem;<br>Albert Q. Wooten, Mocksville, N.C. |
|---|---|---|
| [21] | Appl. No. | 796,986 |
| [22] | Filed | Feb. 6, 1969 |
| [45] | Patented | Apr. 20, 1971 |
| [73] | Assignee | Western Electric Company, Incorporated<br>New York, N.Y. |

[54] APPARATUS FOR WELDING WIRE LEADS TO THE TERMINALS OF ELECTRICAL COMPONENTS
7 Claims, 16 Drawing Figs.

[52] U.S. Cl. .................................................. 219/79, 219/78, 219/161
[51] Int. Cl. ................................................ B23k 9/12, B21j 13/08
[50] Field of Search ......................................... 219/78, 79, 80, 103, 158, 161; 269/275

[56] References Cited
UNITED STATES PATENTS

| 2,465,390 | 3/1949 | Mueller et al. | 219/78X |
| 2,798,936 | 7/1957 | Quinlan | 219/79X |
| 3,322,423 | 5/1967 | Popow et al. | 269/275 |

Primary Examiner—J. V. Truhe
Assistant Examiner—Hugh D. Jaeger
Attorneys—H. J. Winegar, R. P. Miller and S. Gundersen ABSTRACT: An automatic lead welding apparatus includes an article (solid electrolytic capacitor) carrying fixture mounted on a movable carriage, a welding head, an article detector, a carriage position detector, and a lead fabrication and transfer mechanism. Solid electrolytic capacitors are resiliently supported within the carrying fixture with anode wires projecting in cantilevered fashion. The carrying fixture is moved past the welding head where the detectors effect stoppage of the fixture successively to interpose each projecting anode wires within the welding head between a pair of relatively movable welding electrodes. The lead fabrication mechanism feeds, forms, and cuts a lead wire from a wire supply. The transfer mechanism grips and positions the formed lead under the interposed anode wire at which time the welding electrodes are successively operated to flex, clamp, and weld a cantilevered anode wire to a formed lead.

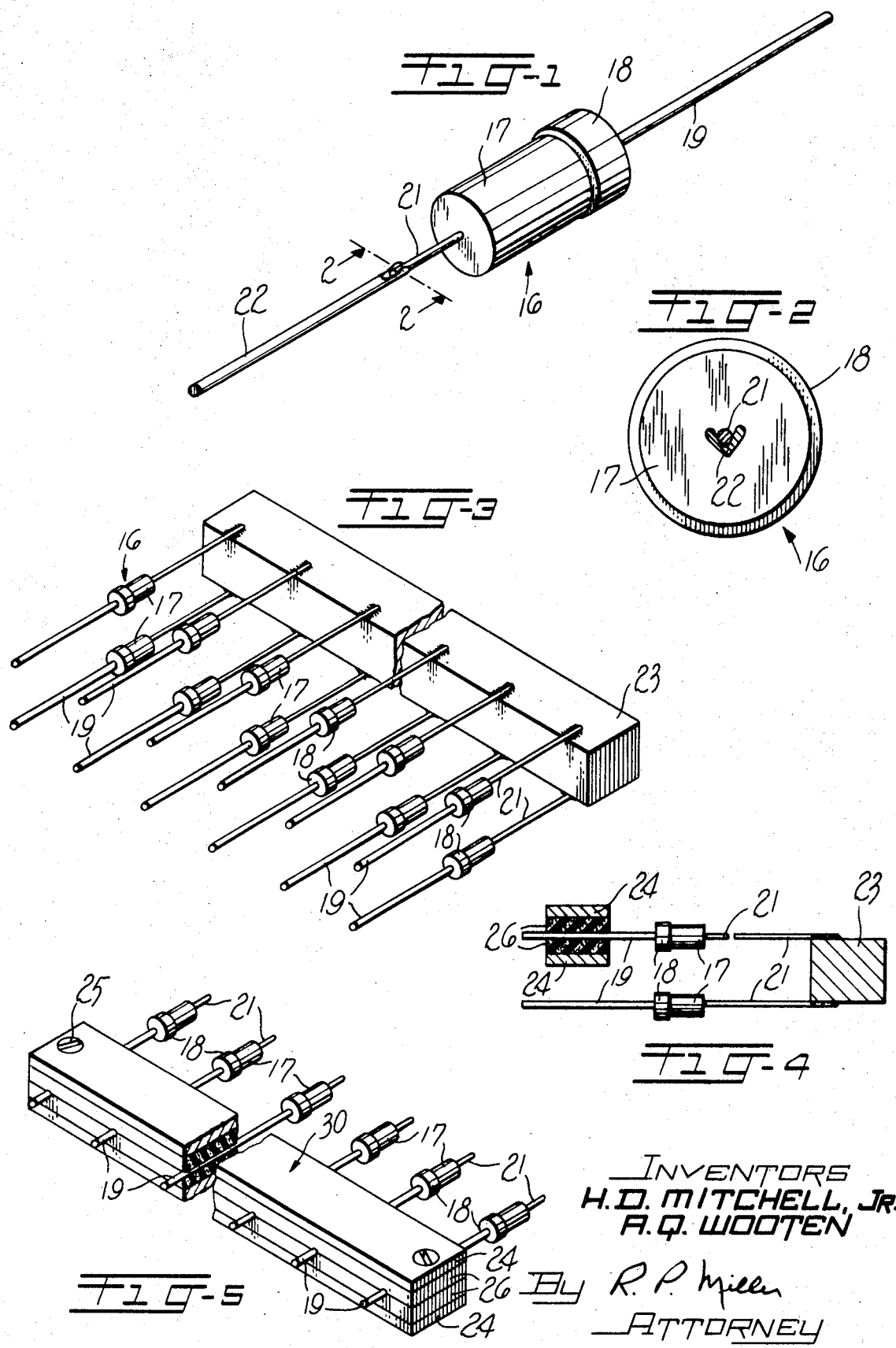

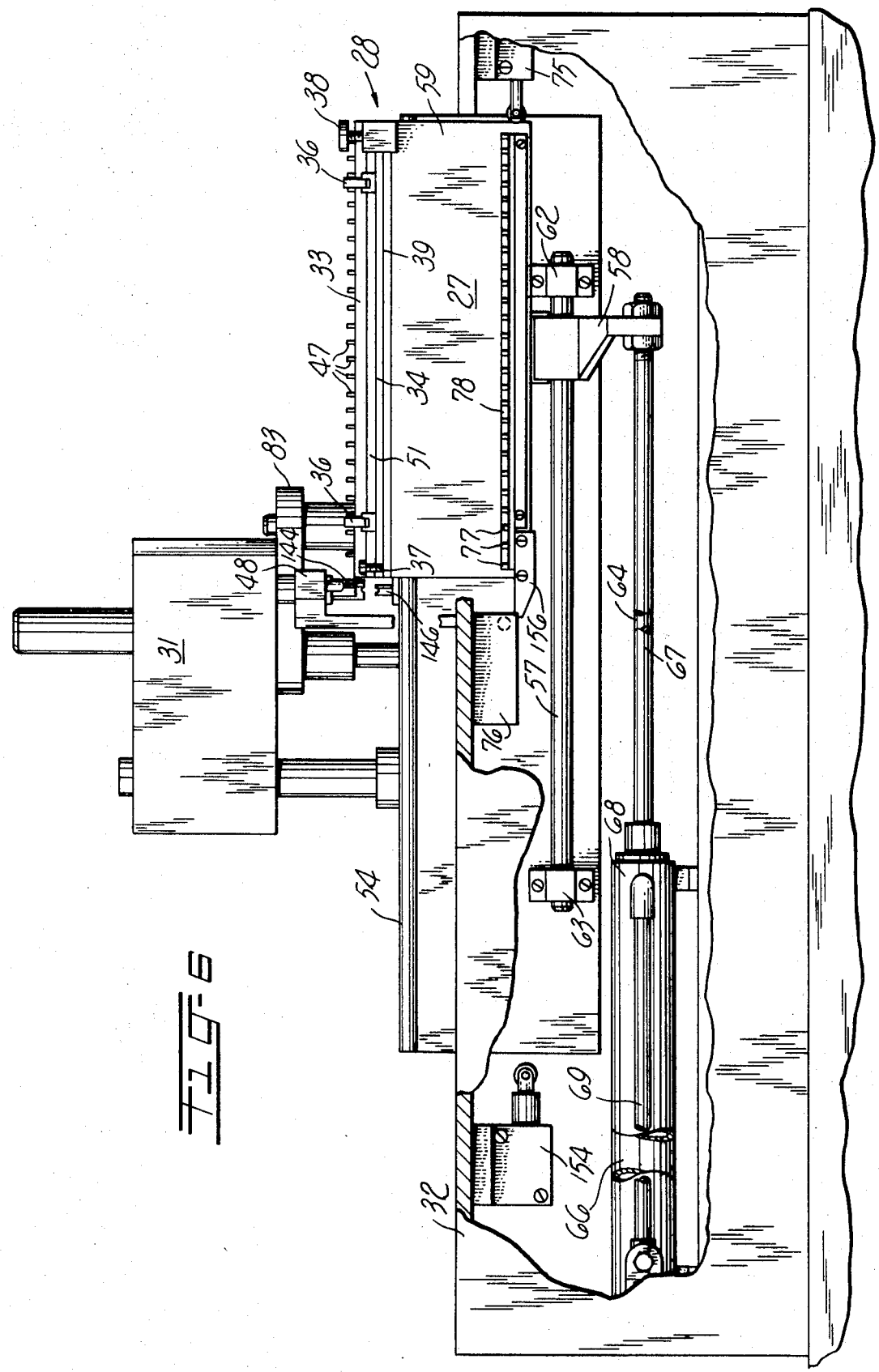

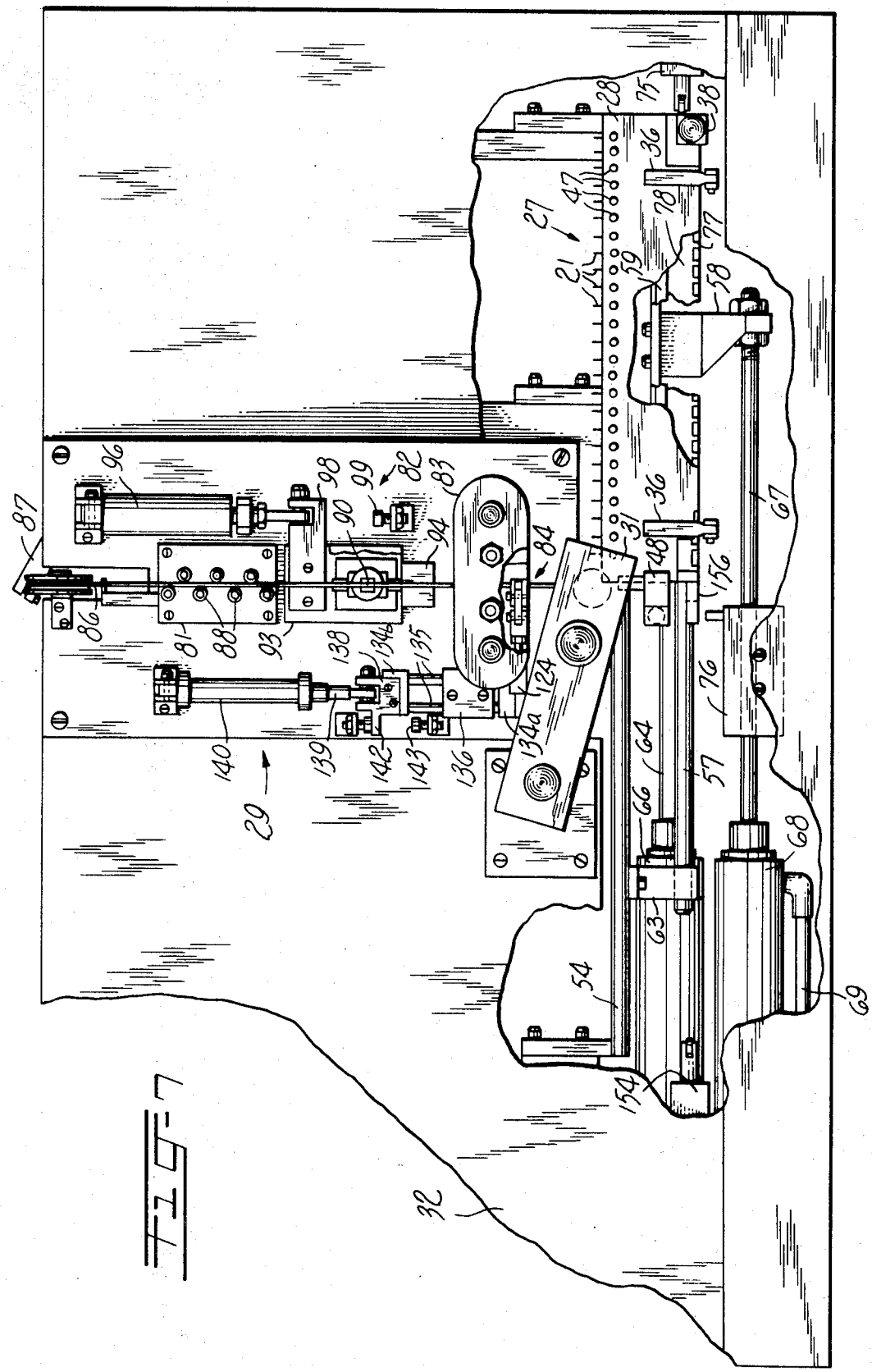

APPARATUS FOR WELDING WIRE LEADS TO THE TERMINALS OF ELECTRICAL COMPONENTS

BACKGROUND OF THE INVENTION

1. Field of the Invention

The invention is concerned with an apparatus for joining wires by lap welding and more particularly with an automatic lap welding apparatus including facilities for resiliently supporting a fragile electrical component having an axially projecting terminal for movement to move the terminal into engagement with a lead wire and for welding the lead wire to the terminal.

2. Technical Considerations

In most automatic lap welding apparatus, facilities must be provided for orienting and aligning the parts prior to welding and for holding the parts in aligned, overlapped contiguous relationship during the welding operation. Where the parts to be welded together are two thin wires and the area of overlap is thus minute, the orienting and holding facilities must be capable of handling and positioning these wires without bending or other damage. Furthermore, where the parts to be welded are an axially projecting terminal on an electrical component, such as the anode wire of a solid electrolytic capacitor, and a lead wire, it is necessary that the welded terminal and lead wire be aligned as nearly as possible on coincident axes.

Though butt welding apparatus is capable of producing coaxially aligned welded leads and terminals, the use of butt welding apparatus presents certain disadvantages which deserve mention, particularly those inherent in butt welding wire leads to the metal anodes of solid electrolytic capacitors.

First, the metal anode wire, which may be made of tantalum, aluminum, tungsten, columbium, hafnium, titanium, zirconium, or the like, may be subjected to substantial contamination at its exposed end where the butt welding must take place. This contamination may cause rapid erosion of the welding electrodes resulting in poor welding characteristics. It is therefore important that the anode wires be cleaned and precautions taken to insure that the welding electrodes and wire ends are maintained clean at the time of welding. These added procedures are obviously time consuming.

Second, the butt welding apparatus must be constructed to insure precision alignment of the lead wire and the anode wire to avoid misaligned or offcenter welds which may result in "blow-outs" or melting and boiling of the wire at the joint due to the welding current concentration in the small common cross section area of the wires.

Further, with respect to butt welding a lead to a tantalum anode terminal of solid electrolytic capacitor, there is always the problem of damaging the connection between the anode wire and the porous, brittle body of tantalum of the capacitor. In order to alleviate some of these difficulties, lap welding may be used. With lap welding, the lead wire can be welded to the anode wire at a section of the anode wire relatively free of contamination. However, simple lap welding of two aligned and overlapped wires does not ordinarily produce a welded product in which the welded wires are aligned on coincident axes, so that the finished component is not axially symmetrical.

Two wires can be lap welded to produce a welded connection wherein the welded wires are substantially aligned on coincident axes by forming a groove in one wire, seating the other wire within the groove and welding the wires together. Where the two wires are a lead wire and a capacitor anode wire, the danger of breakage of the fragile anode wire and damage to the connection of the anode wire to the porous capacitor body must be taken into account.

It would be an advantage to construct an apparatus for welding a fragile wire to another wire having a groove formed in one end including facilities to protect the fragile wire against mechanical shock.

Among the various methods utilized in fabricating solid electrolytic capacitors, there is included batch fabricating of a plurality of capacitors while they are attached by their anode wires to an elongated metal processing bar. The capacitors thus undergoing fabrication must be separated from the processing bar before wire leads can be attached to the anode wires. The detached capacitors must then be welded manually to the wire leads or loaded individually into an automatic apparatus for attaching leads to the anode wires.

It would be a further advantage over the prior art to construct and utilize an automatic apparatus which is able to receive a plurality of capacitors severed from a processing bar as a unit, rather than individually, to save time in loading the apparatus and to avoid unnecessary handling of the fragile capacitors.

SUMMARY OF THE INVENTION

An object of the present invention resides in new and improved facilities for lap welding wires to form coaxial connections. An additional object of the present invention is to resiliently support a first wire in spaced overlying relation to a second wire having a V-shaped groove formed at one end and then move, seat, clamp, and weld the first wire to the second wire.

Another object of the present invention is to provide an automatic apparatus having a pair of relatively movable welding electrodes for moving and clamping a first resiliently supported wire to a second wire and for welding the first wire to the second wire.

A further object of the present invention is to provide apparatus for automatically fabricating and welding wire leads to the solid metal anodes of a plurality of solid electrolytic capacitors, which apparatus can be loaded, in one step, with the plurality of capacitors and whereafter the capacitors are fed into a welding device which welds a lead wire onto each capacitor terminal in coaxial relation.

With these and other objects in view, the present invention contemplates an automatic welding apparatus wherein a carrying fixture is intermittently advanced to position successive, resiliently supported wires in overlying relationship with second wires so that the cyclic movement of a welding electrode engages and moves each resiliently supported wire into position to be lap welded. More particularly, the resiliently supported wire may be a terminal anode wire extending from a resiliently supported solid electrolytic capacitor. The metal anode wires of the resiliently supported capacitors extend from the carrying fixture in cantilever fashion. The fixture is mounted on a movable carriage and facilities are provided for moving the carriage to interpose the anode wires successively between a pair of relatively movable cooperating welding electrodes. The carriage is stopped at each loaded fixture position. Stopping of the carriage may be effected by first detecting a capacitor in the fixture approaching the welding electrodes and then detecting the fixture position itself when it is moved adjacent to the electrodes. When the carriage is stopped a wire lead fabricating and transfer mechanism is operated: (1) to form a V-shaped groove in the leading end of a wire from a wire supply, (2) to feed and sever a predetermined length of the wire, and to transfer the severed wire to a position underlying an anode wire projecting from a capacitor in position adjacent to the welding electrodes. Facilities are provided for operating and moving the welding electrodes to seat, clamp, and weld the anode wire within the V-shaped groove formed in the wire lead. The carriage is cyclically operated following each welding operation to move each successive anode wire between the electrodes whereupon a wire lead is fabricated and welded to each anode wire.

BRIEF DESCRIPTION OF THE DRAWINGS

FIG. 1 is a perspective view of a solid electrolytic capacitor with an anode wire onto which is welded a lead wire;

FIG. 2 is a cross-sectional view of the lead welded to the anode wire taken along the line 2—2 of FIG. 1;

FIG. 3 is a perspective view of a plurality of solid electrolytic capacitors with their anode wires welded to a processing bar;

FIG. 4 is a cross-sectional view of the processing bar of FIG. 3 showing the top row of capacitors resiliently clamped and severed therefrom;

FIG. 5 is a perspective view, partly cut away, of a plurality of clamped capacitors after they have been severed from the processing bar of FIGS. 3 and 4;

FIG. 6 is a front elevational view of the automatic capacitor lead welding apparatus of the invention;

FIG. 7 is a plan view of the welding apparatus, particularly showing facilities for fabricating the wire lead, of FIG. 6;

DETAILED DESCRIPTION

Figure 8:
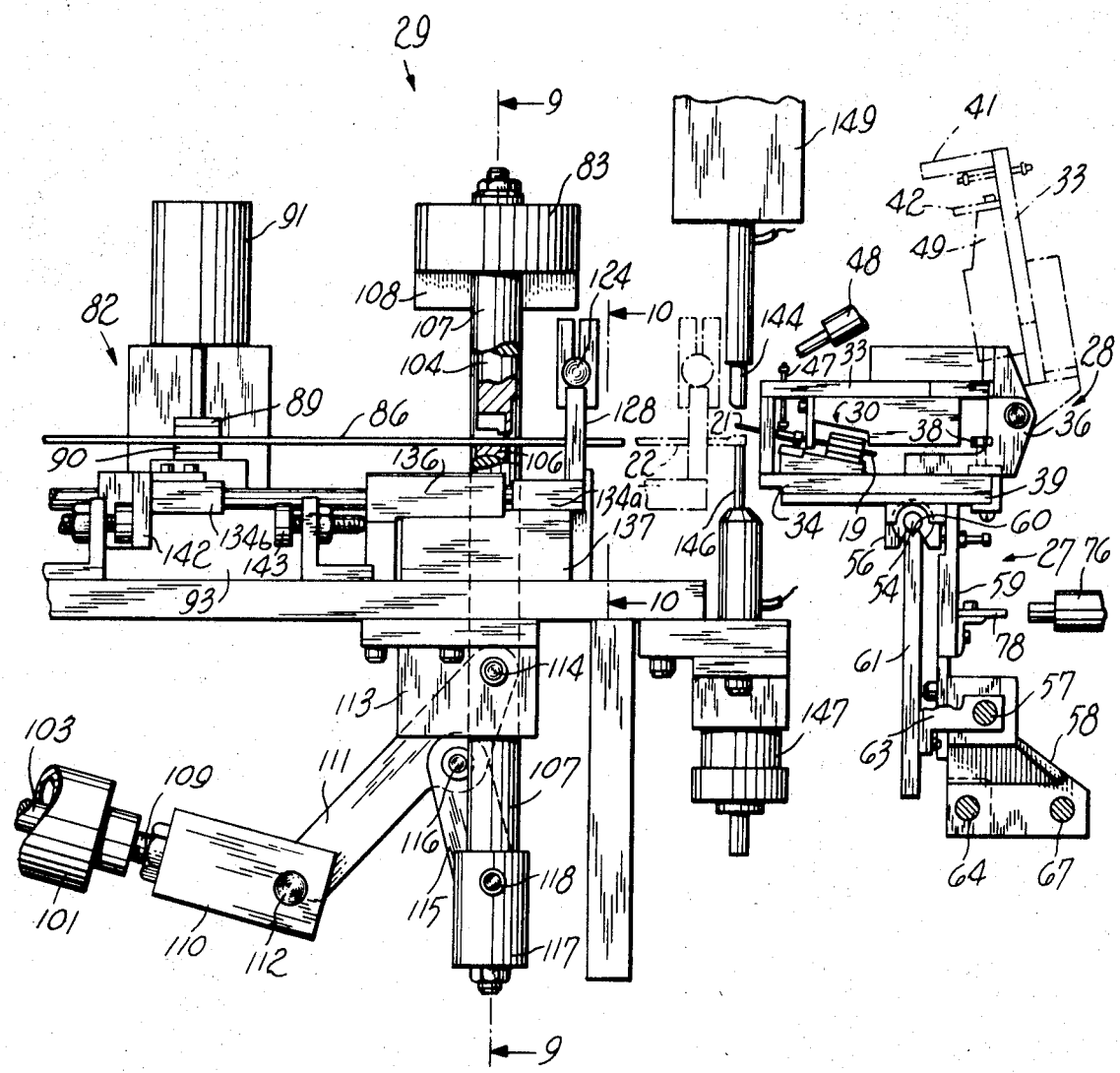
FIG. 8 is a side elevational view of the essential parts of the automatic welding apparatus and relative positions the component mechanisms at a time prior to the welding operation.
Figure 9:
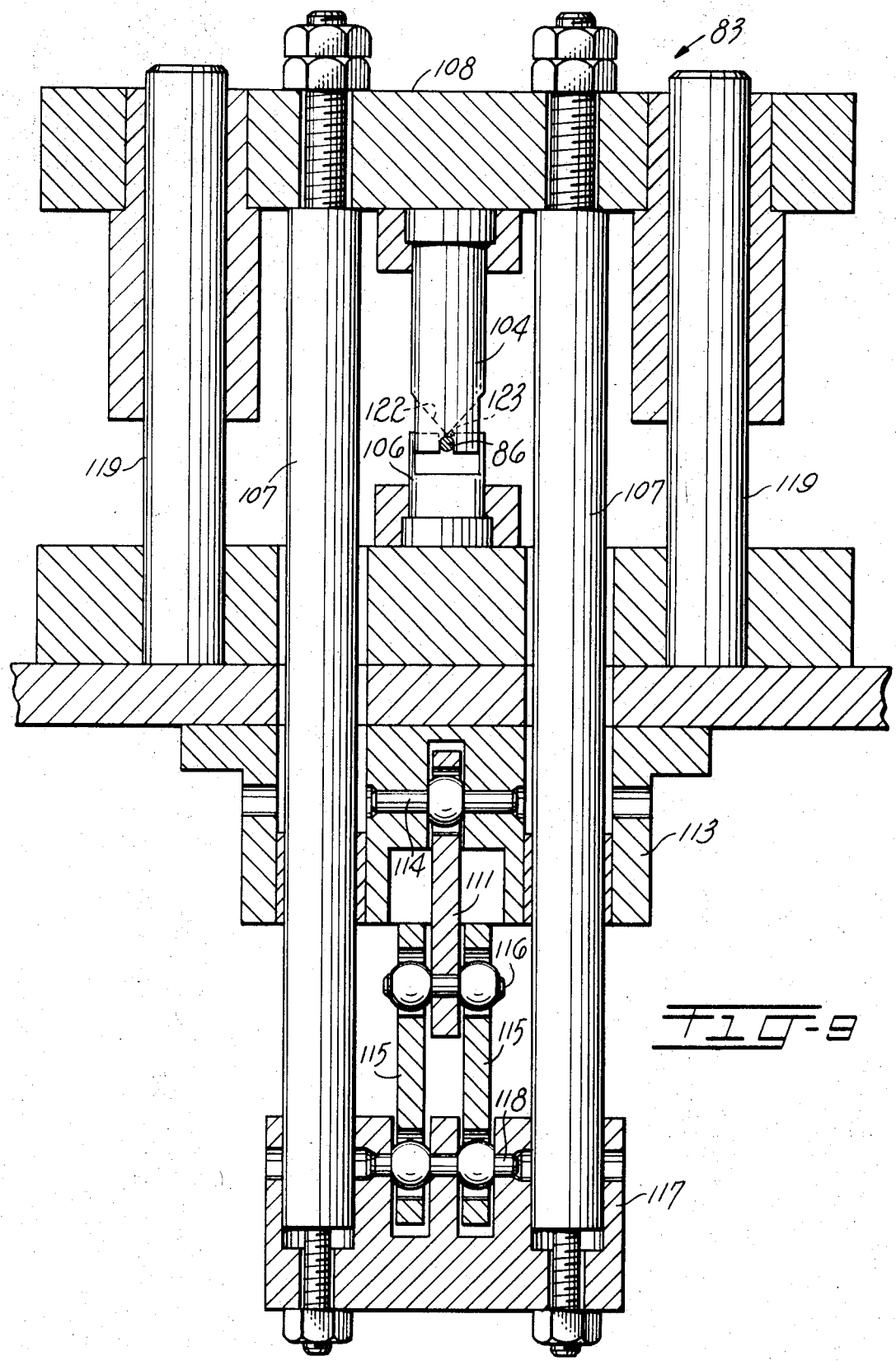
FIG. 9 is a greatly enlarged cross-sectional view of a lead forming and cutting die set taken along the line 9—9 of FIG. 8.
Figure 10:
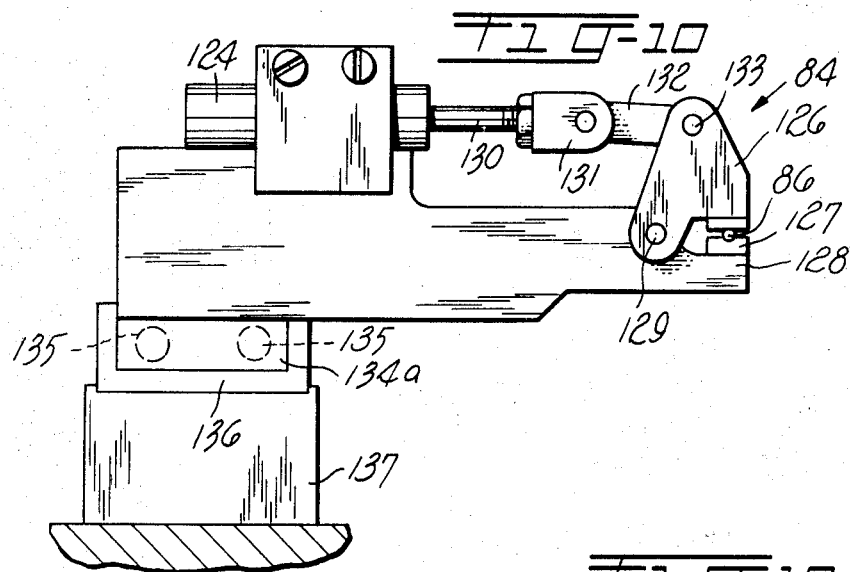
FIG. 10 is an enlarged sectional view taken along the line 10—10 of FIG. 8 showing the wire lead transfer clamp.

Referring now to FIG. 1 of the drawing there is shown an unencapsulated solid electrolytic capacitor 16 having a body portion 17, to one end of which is soldered a conductive cap 18 having an axial lead 19 extending therefrom. The body portion is essentially a mass of sintered, porous tantalum. Projecting from the other end of the body 17 and imbedded therein is a solid metal anode wire or terminal 21, which may be made of tantalum, tungsten, columbium, or the like. A wire lead 22 which may be made of nickel is welded to the anode wire by the apparatus of the present invention.

As can be seen in FIG. 1 and more clearly in FIG. 2 one end of the nickel wire 22 is formed with an anode receiving V-shaped groove or notch, the anode wire 21 being seated within the groove so formed and lap-welded therein. The formation of a groove in the end of the wire lead before it is attached to the capacitor anode wire is necessary to produce a finished product which possesses the advantages of a butt welded joint without the inherent disadvantages. Specifically, by welding the wire lead to the anode wire as shown in FIG. 1 and 2, the welded parts are substantially aligned on coincident axes without the danger of welding electrode erosion arising from contamination in the area of the weld since it has been found that the part of the anode wire where lap welding takes place stays relatively free from contamination.

Before describing the automatic apparatus for lap welding the lead wire 22 to the metal anode wire 21 of the solid electrolytic capacitor 16 to produce the welded joint shown in FIGS. 1 and 2, it is necessary to indicate and briefly describe a particular one of the facilities utilized in handling capacitors of the type described during the fabrication thereof.

Referring to FIG. 3, there is illustrated a plurality of solid electrolytic capacitors 16—16 attached to an elongated metal processing bar 23. Each anode wire 21 is welded to the bar to maintain the capacitors in substantially parallel relationship in two rows on opposite sides thereof during certain fabrication steps.

In order to remove the capacitors 16—16 from the processing bar 23 the anode wires 21—21 may be detached by shearing, utilizing a pair of wire cutters or a component lead shearing apparatus of the type described in Western Electrical Technical Digest No. 5, Jan. 1967, p. 17.

Before shearing the anode wires from the processing bar 23, in order to facilitate removal of the capacitors from the processing bar and loading into the welding apparatus as a unit, the axial leads 19—19 of the capacitors 16—16 are clamped between a pair of clamping bars 24—24 (FIGS. 4 and 5), selectively secured by screw fasteners 25—25 having strips of resilient material 26—26, such as polyurethane foam, adhesively secured to the inside surfaces thereof. The bars 24—24, resilient strips 26—26 and screws 25—25 constitute a holding clamp 30. After shearing of the anode wires, and removal of the capacitors from the processing bar 23, the capacitors held and resilient supported by the holding clamp 30 are ready to be loaded into the welding apparatus as a unit.

The overall apparatus for automatically welding wire leads 22 to the metal anode wires 21 of a plurality of solid electrolytic capacitors 16—16 is shown in FIGS. 6 and 7. In general, the apparatus includes (1) an intermittently movable carriage 27 having a fixture 28 mounted thereon for receiving the holding clamp 30 with clamped capacitors 16—16, (2) a wire lead fabricating and transfer mechanism 29 for fabricating and transferring wire lead 22 to the anode wires 21—21 of the clamped capacitors 16—16, and (3) a welding head 31 for welding the wire leads 22—22 to the anode wires 21—21. These component mechanisms of the apparatus are all supported on a frame 32.

Considering first the fixture 28 and referring to FIGS. 6, 7, 8, and 12, there is shown an upper plate 33 and a lower plate 34 hinged together by a pair of hinges 36—36. The entire fixture 28 is fastened to the carriage 27 by a shoulder screw 37 and a thumb screw 38 which hold the lower plate 34 to a support plate 39 on the carriage 27.

As best illustrated in FIG. 8 the upper plate 33 can swing away from lower plate 34 to enable the fixture to be loaded with the holding clamp 30. As shown in more detail in FIG. 12, clamped capacitors 16—16 are supported within the fixture 28 in spaced parallel relationship (FIG. 7) with their bodies aligned between a pair of spaced combs 41 and 42 (FIG. 13) secured to the upper plate 33, each of which is formed with a plurality of teeth 43—43 and 44—44, respectively, which define a plurality of guide slots for receiving the capacitor anode wires 21—21 and the leads 19—19, respectively, of the supported clamped capacitors.

Between the spaced combs 41 and 42 and above each capacitor position in the fixture there is drilled an aperture 46 for receiving a metal detecting pin 47. When there is a capacitor loaded and present in a fixture position the pin associated with that position is raised upward, projecting out of the aperture 46, and as the carriage 27 is moved past the welding head 31, the position of the pin will be detected by a magnetic pickup head on a pin detector 48 (see FIG. 6).

The holding clamp 30 is held between a pair of inclined steps 49 and 51 secured to plates 33 and 34, respectively. Adhesively secured to a shoulder 52 formed in step 51 is a strip of resilient material 53, which, as the strips 26—26, may be made of polyurethane foam of similar material.

The carriage 27 (FIGS. 6, 7 and 8) is slidably mounted on an upper guide shaft 54 by a block 56 secured to the fixture support plate 39, and on a lower guide shaft 57 by a bracket 58 secured to a carriage plate 59. The shaft 54 is supported in a V-groove 60 formed in the top of a carriage support plate 61 secured to the frame 32. The shaft 57 is secured at one end in a block 62 (FIG. 6) and at the other end in a block 63.

Fastened to the lower portion of the bracket 58 is a carriage drive shaft 64 driven by an air cylinder 66, for sliding the carriage along the shafts 54 and 57, and a shaft 67 controlled by hydraulic cylinder 68, for stopping the carriage at a predetermined position.

Figure 15:
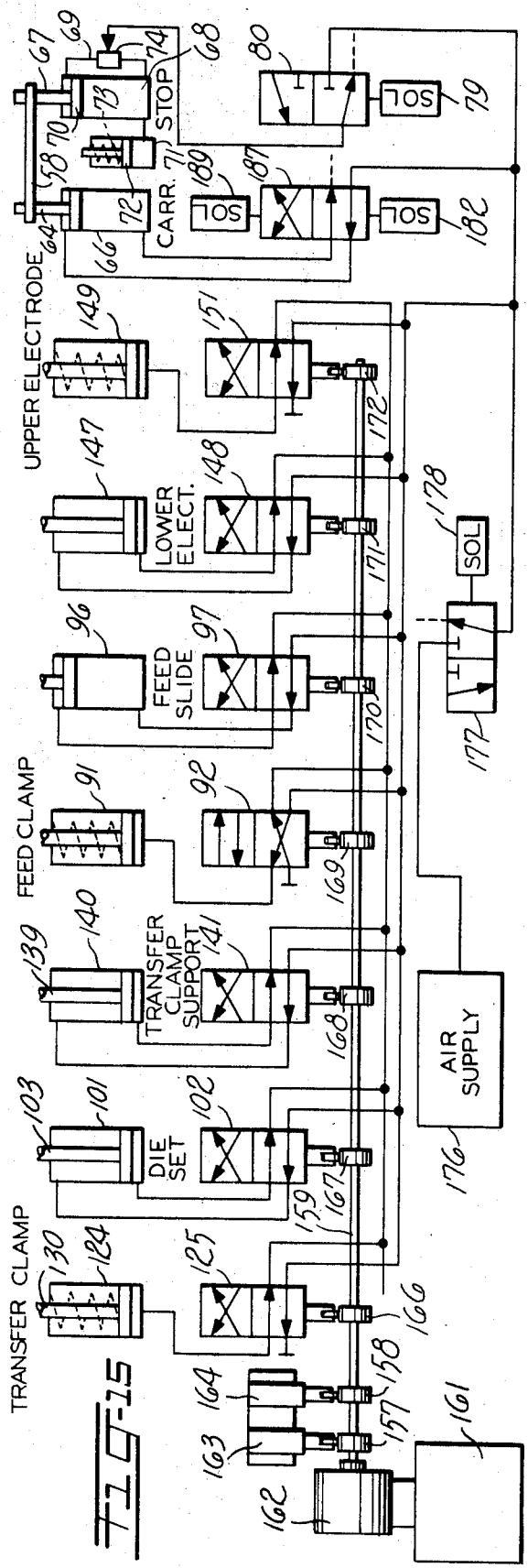
FIG. 15 is a schematic diagram of the pneumatic system for operating the components of the apparatus.

As can be seen by referring to FIGS. 6, 8, and 15, the hydraulic cylinder shaft 67 will follow the carriage drive shaft 64 to which it is connected through bracket 58. Hydraulic cylinder 68 is filled with noncompressible hydraulic fluid. A transfer line 69 allows the fluid to flow from one end of cylinder 68 to the other as piston 70 in cylinder 68 is moved. As the piston 70 retracts, excess fluid (volume displaced by shaft 67) is accumulated in a cylinder 71 (FIG. 15). A piston 72 is loaded by a spring 73 to maintain positive internal pressures on the hydraulic system. When the shaft 67 is advanced, the spring 73 pushing on piston 72 forces the accumulated fluid back into cylinder 68. To stop the carriage 27 it is necessary to merely prevent the hydraulic fluid in cylinder 68 from flowing through the transfer line 69 by closing an air operated valve 74 in the line 69.

When the air cylinder 66 is operated the carriage 27 is moved from a position leftward of the position shown in FIGS. 6 and 7 to the right stopping at each fixture position having a capacitor 16 therein when the transfer line 69 of the hydraulic cylinder 68 is selectively blocked. Stopping of the carriage is controlled by the pin detector 48 when it detects a pin 47, raised up through an aperture 46 by a capacitor, in proximity with it, and the magnetic pickup head of a stop position detector 76 which detects one of a series of projections 77–77 on a spacing template 78 mounted on the plate 59 of the carriage 27 (FIG. 8). There is a one-to-one ratio between the number of projections 77–77 and the number of detectors pins 47–47 in the fixture 28.

The pin detector 48 can only detect a pin 47 when a capacitor 16 is in the fixture position associated with that pin. Unless a pin 47 is detected by the pickup head 48 the carriage will not stop even though the stop position detector 76 detects one or more projections 77–77 on the spacing template 78. The detectors 48 and 76 each act to close one of two serially arranged electrical contacts 48a and 76a (FIG. 14) to energize a solenoid 79 which actuates a solenoid valve 80 (FIG. 15) to operate the valve 74 to stop the carriage 27 only at each fixture position loaded with a capacitor 16. When the carriage 27 is stopped a capacitor anode wire 21 is presented to the welding head 31 to have a wire lead 22 welded to it.

The wire lead fabrication and transfer mechanism 29 (FIGS. 7, 8, 9, 10, and 11) includes a wire straightener 81, a wire feeder 82, a wire forming and cutting die set 83, and a wire transfer clamp 84. Lead wire 86, such as nickel wire, is advanced by the wire feeder 82 from a supply reel or spool (not shown) through the a wire guide 87 and between a plurality of wire straightening rollers 88–88. A wire feed clamp 89 is actuated by air introduced into an air cylinder 91 (FIG. 15) through a cam-operated valve 92 to grip the wire 86 against a pad 90 (FIGS. 7 and 8) projecting from a wire feed slide 93. The wire feed slide 93 is mounted on a guide bar 94 and is operated to slide toward the die set 83 and feed the wire 86 thereto. The feed slide 93 is operated by air introduced into a reversible air cylinder 96, until a crossbar 98 on the slide 93 engages an adjustable stop 99. Thereafter the wire feed clamp 89 is released and the wire feed slide 93 is retracted to its initial position.

The wire forming and cutting die set 83 is operated by air introduced into an air cylinder 101 through a cam-operated four-way valve 102 (FIG. 15). As best shown in FIG. 8, a shaft 103 driven by air cylinder 101 moves a cutting and forming punch 104 toward and away from a cooperating die 106 by lowering and raising a pair of drive rods 107–107 connected to a punch ram 108.

Motion is imparted to the rods 107–107 through a toggle arrangement. Movement of shaft 103 is impressed through a screw coupling 109 to a block 110 having a toggle actuating lever 111 connected at one end thereto by a pin 112. The other end of the lever 111 is connected to a mounting block 113 by a pin 114. A pair of toggle links 115–115 are each connected at one end to the lever 111 by a knee pin 116. The other end of each toggle link 115 is connected to a coupling block 117 by a pin 118. The rods 107–107 are secured to the block 117 and extend upwardly through the mounting block 113 and the base of the die set to the ram 108. The lever 111 and links 115–115 together with the pivot pins 112, 114, 116, and 118 function to accomplish toggle action. As the shaft 103 is moved out of the air cylinder 101 the rods 107–107 are operated through the lever 111 and the toggle links 115–115 to drive the ram 108 downward sliding it on a pair of guide rods 119–119, moving the punch 104 downward toward the cooperating die 106.

As the ram 108 continues its downward movement a cutter 120 on the punch 104 cooperates with a shearing edge 121 on die 106 to shear a lead 22 from the wire 86. At the same time a grooving or notching blade 122 on the punch 104 cooperates with a groove 123 formed in the surface of the die 106 to form a V-shaped wire-receiving groove or notch in the leading end of the wire 86. The groove 123 also prevents lateral movement of the wire 86 during the forming operation and aids in guiding the wire through the die set.

While the end of the wire 86 is being thus formed and a lead 22 is being severed therefrom by the die set 83, the length of wire 86 projecting from the die 83 is gripped by the transfer clamp 84 (FIGS. 7, 8, and 10) operated by air introduced into an air cylinder 124 through a cam-operated valve 125 (FIG. 15). A clamping jaw 126 on transfer clamp 84 acts to clamp the length of wire 86 projecting from die set 83 against a grooved pad 127 on a clamp support 128. The clamping jaw 126 is pivotally mounted on a pintle 129 and is operated by movement of a rod 130 extending from air cylinder 124 which is connected through a clevis 131 and a link 132 to a stud shaft 133 mounted on the jaw 126. The transfer clamp support 128 (see FIGS. 7 and 8) is secured to a tie block 134a connected to another tie block 134b through a pair of rods 135–135. The rods 135–135 are slidable in a bearing block 136 fixed to a spacer block 137. Tie block 134b is connected by a crossbar 138 to a shaft 139 operated by air introduced into an air cylinder 140 through a cam-operated four-way valve 141.

After the lead 22 is severed from the wire 86 the block 134a is advanced until an arm 142 on the crossbar 138 engages an adjustable stop 143 to transfer and position the formed end of the lead 22 at the welding head 31 between a pair of relatively movable cooperating welding electrodes 144 and 146 (see FIG. 8). The formed end of the transferred lead 22 then underlies the cantilevered anode wire 21 of a capacitor 16 resiliently supported within the position in fixture 28 at which the carriage 27 is stopped.

When the lead 22 has been transferred and positioned the lower electrode 146 is moved upward when air is introduced into an air cylinder 147 through a cam-operated four-way valve 148 (FIG. 15) to support and guide the formed end of the lead 22 under the projecting anode wire 21. The lower electrode may have a grooved tip to facilitate supporting of the lead 22. Shortly after the lower electrode 146 is moved upward the upper electrode 144 is moved downward toward the lower electrode 146 when air is introduced into an air cylinder 149 through a cam-operated valve 151.

Figure 12:
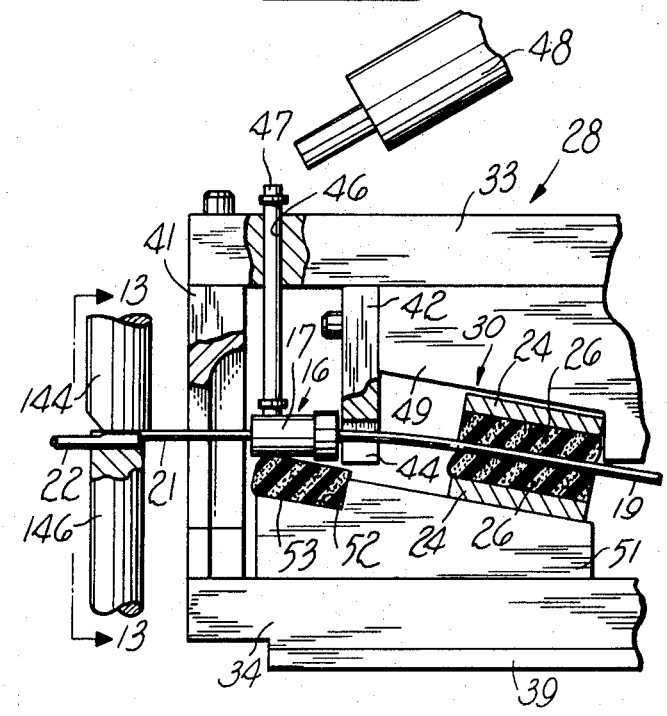
FIG. 12 is an enlarged detail view of a pair of welding electrodes and a clamped capacitor, showing a wire lead being welded to a capacitor anode wire.
Figure 11:
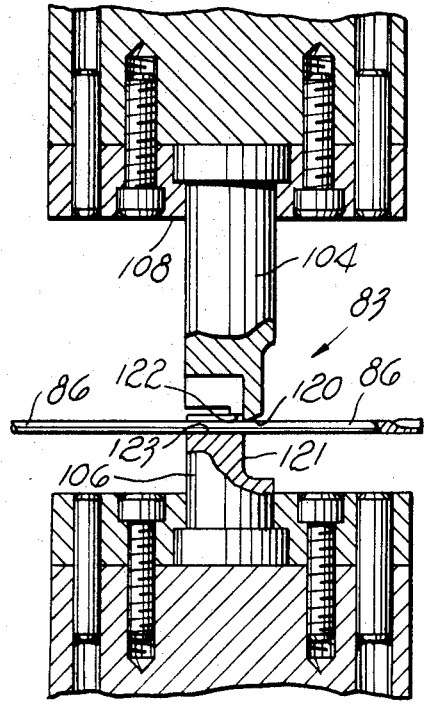
FIG. 11 is a side view, partially in section, of the die set shown in FIG. 9.
Figure 13:
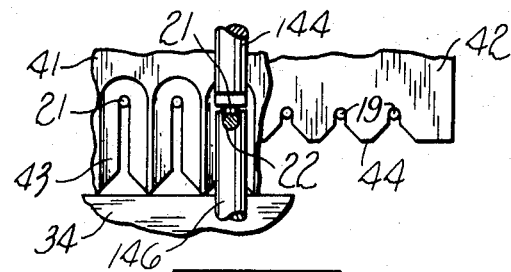
FIG. 13 is a sectional view, partly cut away, of the capacitor anode wire and lead wire spacing combs on the carriage fixture and the welding electrodes taken along the line 13—13 of FIG. 12.

As the upper electrode 144 continues its downward movement the tip thereof engages the projecting anode wire 21 of the resiliently supported capacitor 16 (FIGS. 8 and 12) tilting and seating the anode wire 21 within V-shaped groove formed in the end of the wire lead 22. As shown in FIG. 12 the resilient strips 26–26 deform under the forces exerted by lead 19 when the capacitor is tilted to prevent permanent deformation of lead 19. The resilient strip 53 cushions the brittle capacitor body 17 against damaging shock when the capacitor is tilted downward to seat the anode wire 21 in the groove formed in lead 22. Both electrodes 144 and 146 then cooperate to clamp the lead 22 and the anode 21 therebetween. When a predetermined clamping pressure is reached, welding energy or current is supplied through the electrodes 144 and 146 from a pulse transformer 152, connected to the output of a welding control circuit 153 to weld the anode 21 and the formed lead 22 together. Thereafter the upper welding electrode 144 is moved upward and then the lower welding electrode 146 is moved downward to prevent sticking of the welded anode and lead to either electrode.

During the welding of the anode wire 21 to the lead 22 the wire transfer clamp 24 releases the wire and when the welding is completed the transfer clamp 84 is retracted and positioned to grip a newly advanced length of wire 86 from which a new lead 22 will be cut to be transferred again to the welding head 31. The carriage 27 is again advanced and stopped at the next loaded position in the fixture 28. The cycle continues until each capacitor 16 loaded in the fixture 28 has a lead wire 22 welded to its anode wire 21. The carriage 27 will continue to move until it actuates the limit switch 75 (FIG. 6). At that time the entire apparatus ceases operation.

OPERATION

The initiation and stopping of the apparatus is controlled by limit switch 75 and another limit switch 154 (FIGS. 6 and 14) operated by a bar cam 156 secured to the carriage 27 and the operation of the various component mechanisms is controlled by a cam controller shown in FIG. 15. Referring now to both FIGS. 14 and 15, cams 157 and 158 mounted on a shaft 159 rotated by a motor 161 through a suitable reducing mechanism 162 operate the contacts of an indexing cam switch 163 and a homing cam switch 164 respectively which control movement of the carriage 27 and the supply of electrical operating potential to motor 161. Cams 166—172, also mounted on the shaft 159 rotated by motor 161, actuate reversible valves 125, 102, 141, 92, 97, 148, and 151, respectively, to control the operation of the wire lead fabrication and transfer mechanism 29 and the movement of the welding electrodes 144 and 146.

Figure 14:
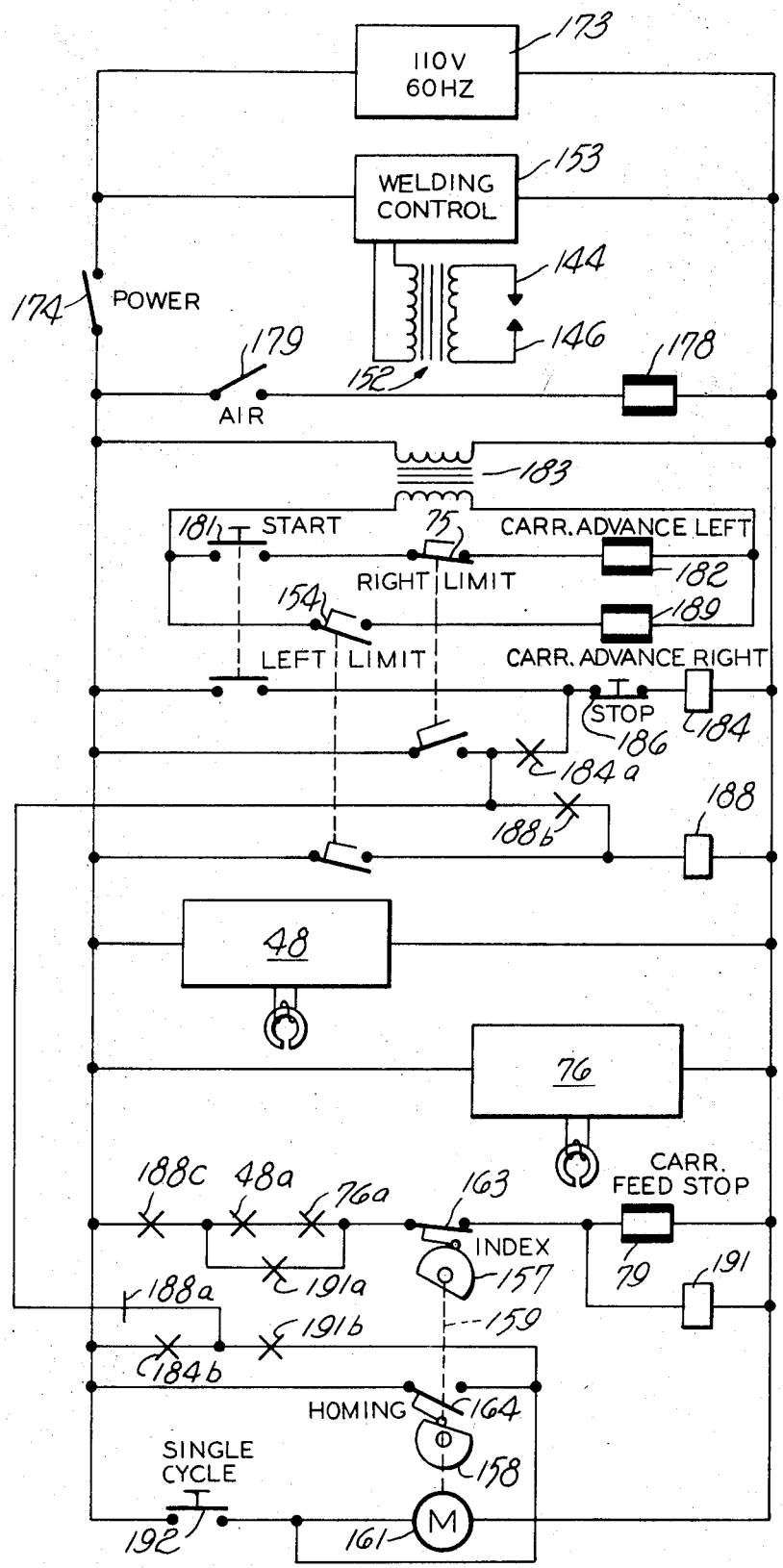
FIG. 14 is a schematic diagram of the electrical circuit for controlling the operation of the overall apparatus.
Figure 16:
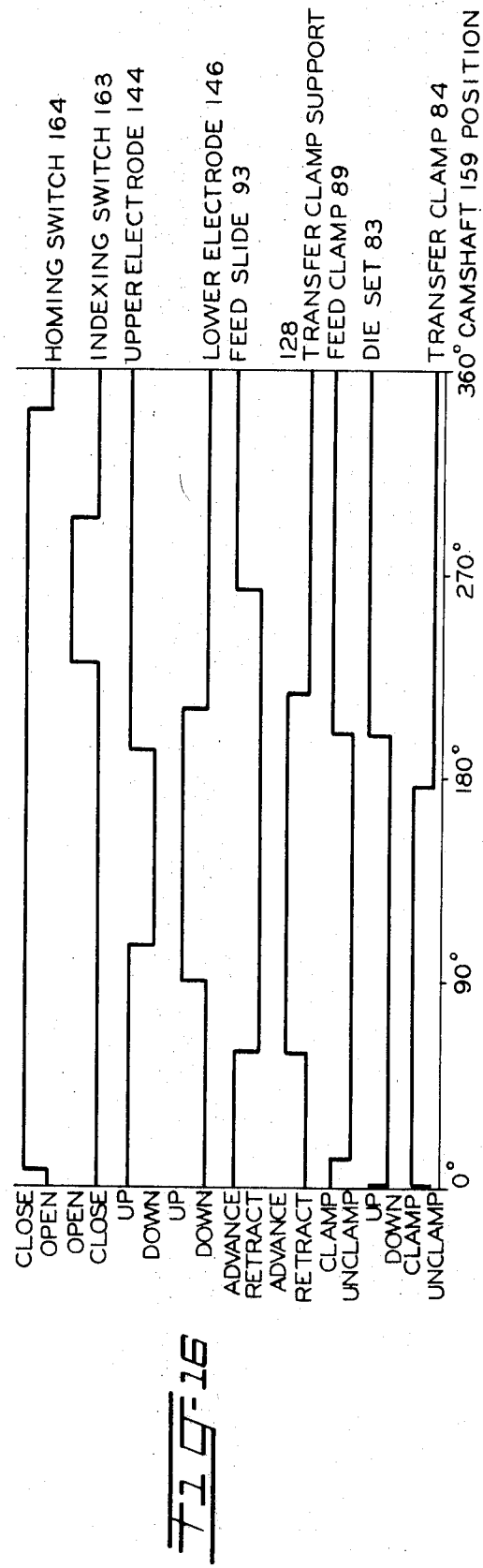
FIG. 16 is a timing diagram showing the sequence of operation of the component mechanisms of the automatic lead welding apparatus during one cycle of operation.

The sequence of operation of the various parts of the apparatus can be best understood by referring to the electrical circuit diagram of FIG. 14, considered in conjunction with the pneumatic diagram of FIG. 15 and the timing diagram of FIG. 16.

The limit switches and cam switches in the circuit diagram are in the conditions shown at the end of the last cycle of operation of the apparatus, that is, with the carriage 27 in the extreme rightmost position engaging the limit switch 75 holding it in its operated condition. Operating potential to all the circuits of the apparatus, except the welding system 153 may be supplied by a 110 volt 60 Hz. source 173 through a power switch 174. The welding system 153 has its own internal power supply. Air is supplied to the pneumatic system from an air supply 176 through a valve 177 actuated by a solenoid 178 which is energized through the closed contacts of a control switch 179.

In the circuit diagram relay contacts are represented by detached contacts, crosses (X's) indicating make or normally open contacts and bars (I's) indicating break or normally closed contacts. The contact associated with a designated relay will be numbered the same as the relay with a lower case letter following the number to identify the particular contact.

After loading clamped capacitors 16—16 into the fixture 28 the operator presses a pushbutton start switch 181 energizing a solenoid 182 from the secondary winding of a stepdown transformer 183 through the upper contacts of limit switch 75 held closed by the carriage 27. Energization of solenoid 182 actuates a reversing valve 187 which operates air cylinder 66 moving the carriage 27 rapidly toward the left disengaging limit switch 75 allowing the upper contacts thereof to open and the lower contacts thereof to close. Closure of start switch 181 also closes its lower contacts to an energizing circuit through a normally closed pushbutton stop switch 186 to a relay 184. Energization of the relay 184 operates make contacts 184a and 184b holding relay 184 energized through the closed lower contacts of limit switch 75 and an auxiliary hold circuit through a normally closed break contact 188a of a relay 188, so that after pressing the pushbutton start switch 181 the operator need not keep it pressed until the carriage moves off of the limit switch 75, but may release it immediately.

As the carriage 27 moves rapidly to the left bar cam 156 engages limit switch 154 closing the upper and lower contacts thereof energizing a solenoid 189 and the relay 188. Energization of solenoid 189 actuates reversing valve 187 operating air cylinder 66 to reverse and initiate movement of the carriage 27 toward the right. Energization of relay 188 opens contact 188a and closes contacts 188b and 188c. Opening of contact 188a opens the auxiliary holding circuit for relay 184 which is still held energized through the now closed lower contacts of limit switch 75. Closure of contact 188b holds relay 188 energized through the now closed lower contacts of switch 75. Closure of contact 188c sets up a relay 191 and stop solenoid 79 for energization upon closure of contacts 48a and 76a associated with the detectors 48 and 76.

As the carriage moves toward the right, the pin detector 48 will detect the raised pin 47 associated with the first loaded position in the fixture 28 on the carriage 27, operating contact 48a. Then the stop position detector 76 will pick up the first stop position represented by the first projection 77 on the carriage spacing template 78 operating contact 76a.

Upon operation of both contacts 48a and 76a the stop solenoid 79 and the relay 191 will be energized through now closed contact 188c and the normally closed indexing cam switch 163. Energization of solenoid 79 actuates valve 80 operating valve 74 to stop the carriage 27 with the first loaded fixture position at the welding head 31. Energization of relay 191 operates contacts 191a and 191b, the former holding solenoid 78 and relay 191 energized through contact 188c and indexing switch 163, and the latter supplying driving current to camshaft drive motor 161 through now closed contact 184b to rotate the camshaft 159 operating the cam switches and the pneumatic valves associated with the camshaft to feed, form, cut, transfer, and weld the wire lead 22 to the anode wire 31 of the capacitor 16 in the fixture position at the welding head 31.

As the camshaft 159 is rotated it closes the homing switch 164 to hold the motor 161 operated for one complete cycle in which a lead 22 is welded to an anode wire 21.

The initial rotation of shaft 159 moves cams 166 and 167, respectively, to actuate cam valves 125 and 102. Actuation of cam valve 125 introduces air into the air cylinder 124 to operate the transfer clamp 84 to grip the projecting leading end of the wire 86. Actuation of cam valve 102 introduces air into the air cylinder 101 to operate the cutting and forming die set 83 to sever a formed lead 22 and form an anode-receiving V-shaped groove in the new leading end of the wire 86. The homing switch 164 is then closed.

Shortly after operation of die set air cylinder 101, the cam valve 92 is actuated by cam 169 to exhaust air from the air cylinder 91 to permit the wire feed clamp 89 to release the wire 86 now clamped by die set 83. The cam valve 97 is then actuated by cam 170 to operate the air cylinder 96 to retract the wire feed slide 93. The cam 168 then actuates cam valve 141 to operate air cylinder 140 to advance the wire transfer clamp 84 to position the formed end of the lead 22, gripped by the transfer clamp 84, to underlie the cantilevered anode wire 21 of the capacitor 16 in the position fixture 28 on the stopped carriage 27 presented to the welding head 31, between the relative movable welding electrodes 144 and 146.

At this time the cam valve 148 is actuated by the cam 171 to operate air cylinder 147 to raise the lower electrode 146, moving it up to support the formed end of the positioned lead 22. Shortly after the lower electrode begins its upward movement the cam 172 actuates the valve 151 to operate the air cylinder 149 to move the upper electrode 144 downward to engage the cantilevered anode wire 21 of the capacitor 16 positioned in the welding head 31. The anode wire 21 is moved by the upper electrode 144 and seated in the groove formed in the leading end of the wire lead 22, while the capacitor is resiliently supported by the strips 26–26 and cushioned against shock by resilient strip 53 in the fixture 28. The upper and lower electrodes 144 and 146 are urged toward each other to clamp the anode 21 to the lead 22. The welding system 153, which is of a commercially available type, operates in response to a predetermined clamping pressure between the electrodes 144 and 146 to deliver a current pulse through the secondary of the transformer 152 and the electrodes 144 and 146 to apply welding energy to the clamped anode wire 21 and lead 22 to join them together. As the cams 171 and 172 continue to rotate the valves 148 and 151 are further actuated to operate the air cylinder 147 and the air cylinder 149, moving the electrodes 144 and 146 downward and upward, respectively, away from the welded parts.

During the welding operation cam 166 further actuates valve 125 exhausting air from the transfer clamp air cylinder 124, permitting the transfer clamp 84 to release its grip on the lead 22. At this time valve 102 is further actuated by the cam 167, reversing the air in air cylinder 101 to move the ram 108 of the die set 83 upward. While the ram 108 is moving upward, the wire feed clamp 89 is actuated by air introduced into air cylinder 91 through valve 92 through rotation of cam 169. The wire transfer clamp 84 is then retracted in response to the reversal of air in air cylinder 140 through valve 141 upon further actuation thereof by cam 168.

After the wire transfer clamp 84 retracts, cam 157 acts to open indexing switch 164 deenergizing solenoid 79 and relay 191. Deenergization of solenoid 79 operates valve 80 to deactuate the air-operated valve 74 to permit the carriage 27 to move. Deenergization of relay 191 allows contacts 191a and 191b to open. Note that the motor 161 is still energized through the closed homing switch 164.

Continued rotation of the motor 161 rotates cam 170 which actuates valve 97 reversing air in the air cylinder 96 to advance the wire feed slide 93, to advance a predetermined length of wire 86, having an anode-receiving V-shaped groove formed on its leading end, beyond the cutting edge 121 of punch 104, ready to be gripped by wire transfer clamp 84 and severed and the new leading edge of the wire 86 grooved by the die set 83. The rotating cam 157 then closes indexing switch 163 but the solenoid 79 and the relay 191 will not be energized thereby until the now open detector contacts 48a and 76a are closed when a subsequent pin 47 and a subsequent projection 77 on the template 78 are detected by the detector heads 48 and 76.

Upon each closure of contacts 48a and 76a the solenoid 79 is energized and the carriage 27 stops at each successively presented loaded fixture positioned and the relay 191 is energized to start the feeding, forming, cutting, transferring, and welding operations for welding each lead 22 to each successively presented anode wire 21. The operation continues in this manner until all of the capacitors 16–16 are loaded in the fixture 28 have had leads 22–22 welded to their anode wires 21–21.

After the last capacitor 16 in the fixture has had a lead attached to its anode the carriage 27 continues to move to the right until the carriage 27 engages the limit switch 75 opening its lower contacts and closing its upper contacts. Opening of the lower contacts of limit switch 75 deenergizes relays 184 and 188. Relay 184, previously held through contact 184a, opens contacts 184a and 184b. Relay 188 closes contacts 188a and opens contacts 188b. When 184b opens, the motor 161 is still held energized only through the homing switch 164. As the motor 161 continues to rotate, the cam 158 opens switch 164 stopping the motor 161. The finished capacitors are then removed and the fixture 28 thereafter may be loaded with another hold clamp 30 of capacitors 16–16 and the pushbutton start switch 181 may be pressed to operate the apparatus in the manner previously described.

As shown in FIG. 14 the apparatus may be stopped by pressing the stop switch 186 to deenergize relay 184. The motor 161 will then stop when the homing switch 164 is opened as described in the previous paragraph. Once the stop switch 186 has been pressed and held open the apparatus, if desired, may be operated through a single cycle by momentarily pressing a single cycle switch 192 to energize the motor 161. The motor 161 will then turn itself off by operating the cam 158 opening the homing switch 164.

It will be noticed that the motor 161 does not stop between welds since the carriage 27 moves to the next loaded position and the detector contacts 48a and 76a close before the homing switch 164 is opened.

We claim:

1. In an apparatus for welding a first element onto a second element:
   means for yieldably supporting the first element at a spaced distance from said second element;
   means for moving the first element against the effect of said yieldable means into engagement with said second element; and
   means rendered effective upon movement of the first element into engagement with the second element for applying energy to the engaged elements to weld them together.

2. In an apparatus for welding a first element onto a second element as recited in claim 1, wherein said yieldable support means includes:
   a first resilient pad;
   a second resilient pad spaced from said first resilient pad for defining a space for receiving the end of the first element; and
   means for clamping said resilient pads together to grip the end of the first element yieldably therebetween.

3. In an apparatus for welding a first element onto a second element as recited in claim 1, wherein:
   said first element moving means is a movable welding electrode; and
   said energy applying means includes said first movable welding electrode and a second movable welding electrode opposing and aligned with said first electrode.

4. In an apparatus for welding a second axial lead to the end of an article having a first axial lead at its opposite end:
   means for resiliently clamping the first axial lead of the article to support the article;
   a pair of spaced, relatively movable welding electrodes for welding the second lead to the unsupported end of the article;
   means for positioning said supporting means to position the unsupported end of the article between said electrodes;
   means for positioning the second lead between said electrodes and aligned with the unsupported end of the article;
   means for imparting relative movement to said electrodes to urge the unsupported end of the article into contact with the second lead; and
   means rendered operative following contact of the unsupported end of the article with the second lead to apply welding energy to said electrodes to weld the second lead to the article.

5. In an apparatus for welding parts onto articles:
   a pair of welding electrodes mounted for relative movement to move opposed ends thereof together;
   an elongated carriage mounted for movement transverse to the direction of movement of the electrodes;
   a first elongated resilient support mounted along the length of said carriage;
   a second elongated resilient support mounted on said carriage cooperating with said first resilient support for gripping a plurality of articles and positioning each article at an acute angle with respect to the direction of movement of said electrodes;
   means for incrementally advancing the carriage to position each gripped article between said electrodes;

means operated following each advance of the carriage for advancing a part onto the article positioned between the electrodes; and means for imparting relative movement between said electrodes to move the opposed ends to engage the article and part to pivot the article through said angle against the first resilient support.

6. In an apparatus as defined in claim 5:

a third resilient support mounted on said carriage and spaced from said articles gripped by said first and second resilient supports for engaging and cushioning each article pivoted by said electrodes.

7. In an apparatus for welding parts onto articles as recited in claim 5, wherein said incremental advancing means includes:

means for continuously urging said carriage to move each gripped article between said electrodes;

a plurality of pins mounted on said carriage, each movable from a rest position to an activated position by a gripped article for indicating the presence of an article gripped by said resilient supports;

a plurality of spaced projections extending from said carriage, said projections being equal in number to the total number of movable pins for indicating the positions of the total number of articles capable of being gripped by said resilient supports;

means positioned to detect an activated pin associated with a gripped article moved between said electrodes;

means positioned to detect a projection on said carriage aligned with said electrodes; and means rendered operative upon actuation of both said activated pin detecting means and said projection detector means for interrupting said continuous urging means to stop and position an article between said electrodes.